(No Model.) 2 Sheets—Sheet 1.
W. D. PORTER.
COTTON CHOPPER AND CULTIVATOR.
No. 423,179. Patented Mar. 11, 1890.
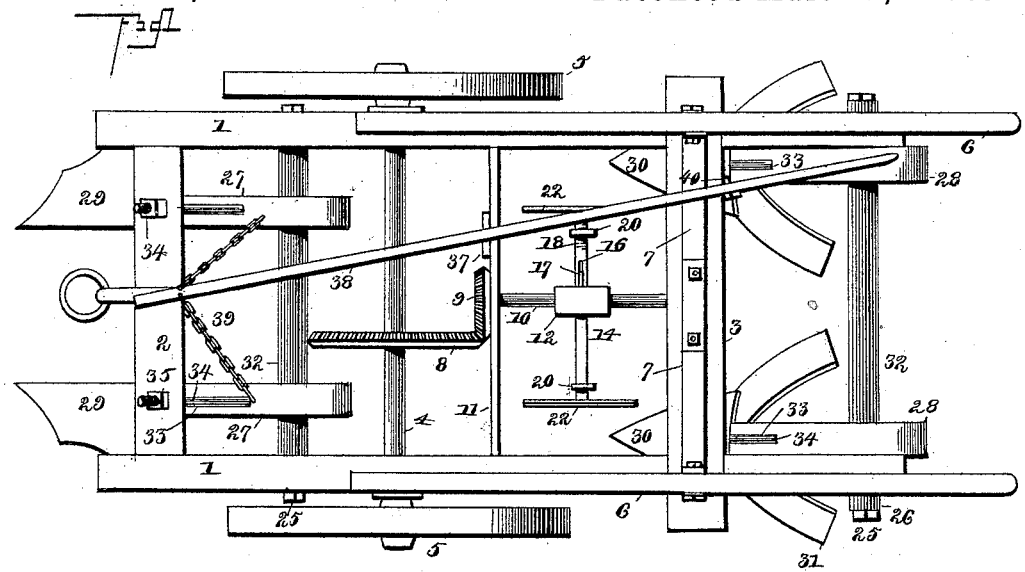
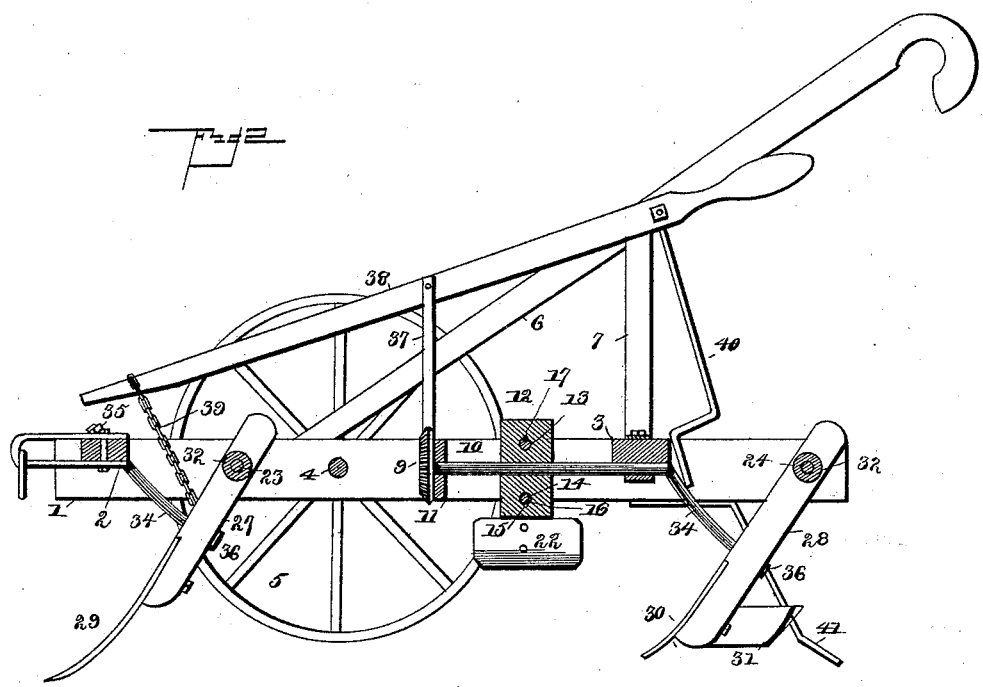
Witnesses
John Imurie
Wm Bagger
Inventor
William D. Porter
By his Attorneys
C. A. Snow & Co.
N. PETERS, Photo-Lithographer, Washington, D. C.

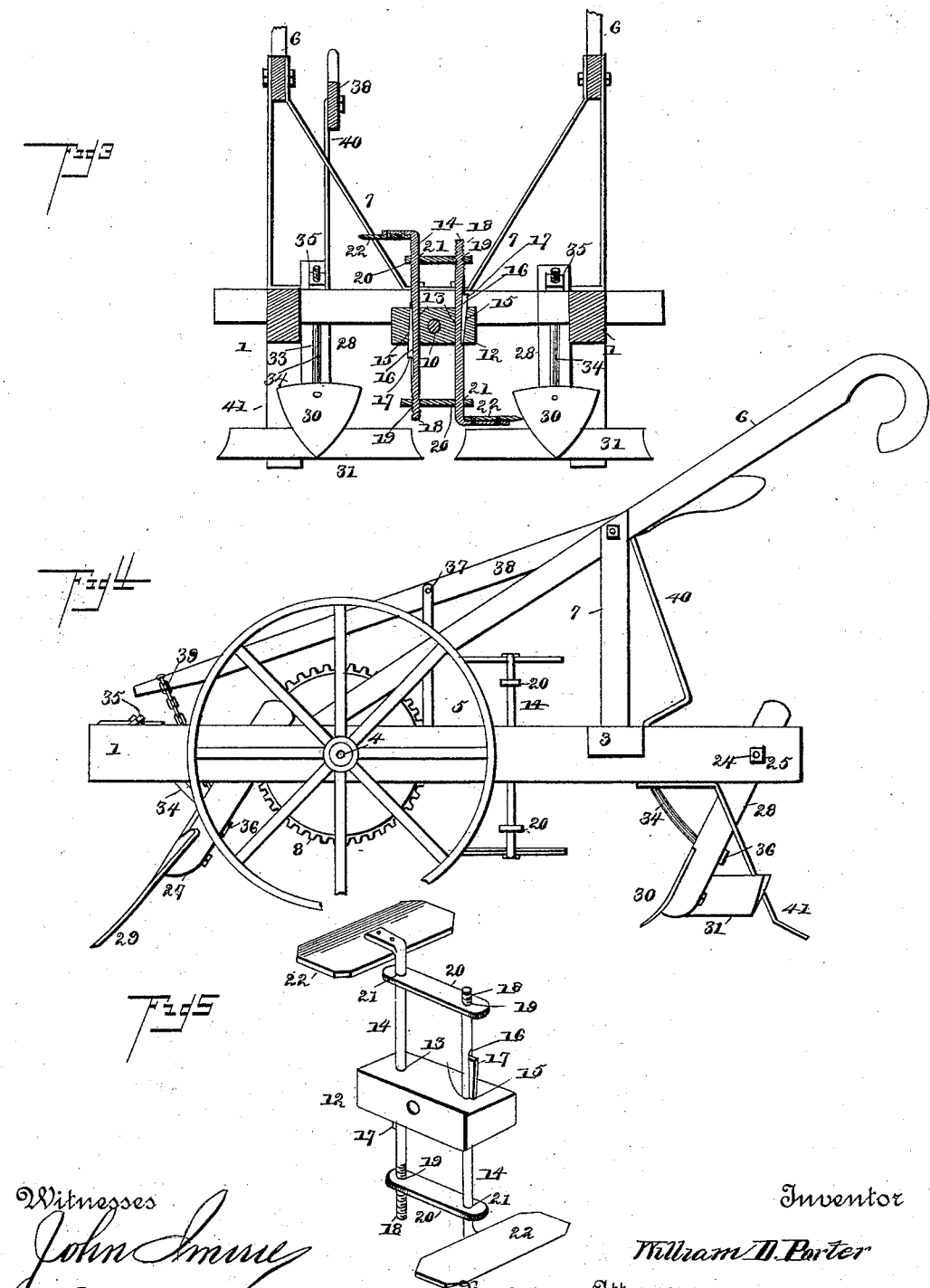

UNITED STATES PATENT OFFICE.

WILLIAM DANIEL PORTER, OF MOUNT PLEASANT, TEXAS, ASSIGNOR OF ONE-HALF TO J. G. W. WOOD, OF SAME PLACE.

COTTON CHOPPER AND CULTIVATOR.

SPECIFICATION forming part of Letters Patent No. 423,179, dated March 11, 1890.

Application filed November 12, 1889. Serial No. 330,045. (No model.)

*To all whom it may concern:*

Be it known that I, WILLIAM DANIEL PORTER, a citizen of the United States, residing at Mount Pleasant, in the county of Titus and State of Texas, have invented new and useful Improvements in Cotton Choppers and Cultivators, of which the following is a specification.

This invention relates to cotton choppers and cultivators; and it has for its object to construct a machine of this class which shall be simple in construction, durable, and effective in operation, and which may be easily manipulated.

The invention consists in the improved construction, arrangement, and combination of parts, which will be hereinafter fully described, and particularly pointed out in the claims.

In the drawings hereto annexed, Figure 1 is a plan view of a cotton chopper and cultivator embodying my improvements. Fig. 2 is a longitudinal vertical sectional view of the same. Fig. 3 is a vertical transverse sectional view taken through the rotary chopping-hoes. Fig. 4 is a side elevation. Fig. 5 is a perspective detail view of the cotton-chopping mechanism detached.

Like numerals of reference indicate like parts in all the figures.

The frame of my improved cotton chopper and cultivator is composed of side beams 1 1, connected at their front ends by a cross-beam 2, and at a distance from their rear ends by a cross-bar 3, said beams being bolted together in any suitable manner. The side beams of the frame have bearings for the axle 4, upon which the transporting-wheels 5 5 are firmly secured. Handles 6 6 are attached to the sides of the frame and to braces 7 7, which are secured upon the rear cross-bar 3.

Upon the axle 4 is secured a bevel gear-wheel 8, which meshes with a pinion 9, mounted upon the front end of a shaft 10, which is journaled in suitable bearings in the rear cross-bar 3 and in a transverse brace 11, which connects the side bars of the frame in front of the said rear bar. Firmly secured upon the said shaft 10 is a rectangular block 12, which is provided on opposite sides of the said shaft with transverse perforations 13 13, adapted to receive the shanks 14 of the hoes, which are inserted from opposite sides through the said perforations. The latter are provided with longitudinal grooves 15, which register with corresponding grooves 16 in the hoe-shanks and are adapted to receive keys 17, by which the said shanks when properly adjusted are prevented from turning in their respective perforations. The ends of the hoe-shanks are screw-threaded, as shown at 18, to enter female threaded perforations 19 in the connecting-plates 20, each of which is provided at its opposite end with a perforation 21, of sufficient size to admit of the passage through it of one of the hoe-shanks. In adjusting the latter in position for operation the shanks are first passed from opposite sides through the perforation 21 in one of the plates 20, next through the perforations in the rectangular block 12, and finally into the screw-threaded perforation 19 of the opposite plate. It will be seen that by screwing the hoe-shanks up into the said connecting-plates the distance of the hoe-blades 22 from the central shaft may be accurately gaged. When this has been properly adjusted the keys 17 are driven into place, and the chopping-hoes are then ready for operation. When it shall be desired to cause the said hoes to cut more or less deep into the soil, the keys 17 may be removed temporarily, while the proper adjustment is being made, by simply screwing the hoe-shanks out or in, as the case may require.

The hoe-blades 22 may be secured to the shanks in any suitable manner, or they may be formed integrally therewith.

The side beams of the frames are connected in rear of the front and rear bars 2 and 3 by transverse bolts or rods 23 and 24, the ends of which latter extend beyond the side pieces of the frame, and are screw-threaded to receive the nuts 25 and sleeves 26. Mounted pivotally upon the said transverse rods are the feet or standards 27 28, the former of which carry the plows 29, while the latter have the cultivator-blades 30 and heel-sweeps 31 of ordinary construction. The feet or standards are spaced upon their respective rods by means of sleeves 32, which may be readily removed for the substitution of others of different length when desired. The rear standards, carrying the cultivators and heel-sweeps, may also be adjusted on the outside of the side pieces of the frame in the place of the sleeves 26 whenever desired. The standards 27 28 are provided with slots 33, working on curved bolts 34, extending through the cross-bars 2 and 3, and provided at their upper ends with nuts 35, by means of which they may be adjusted to regulate the depth to which the plows and cultivators shall be allowed to penetrate into the ground. The said bolts also serve to steady and brace the said standards and to prevent any vibrating motion thereof during operation. The lower ends of the bolts 34 are provided with heads 36, against which the standards rest during operation.

Rising from the transverse brace 11 is an upright 37, at the upper end of which is fulcrumed a lever 38, the front end of which is connected by chains 39 with the plow-standards 27, which by depressing the rear end of the said lever may be raised out of the ground. The lever is provided near its rear end, which forms a handle, with a hook 40, adapted to catch under the rear cross-bar 3, and thus retain the plows in a raised position.

Secured under the side pieces of the frame, near their rear ends, are the downwardly-extending flat springs 41, which serve to steady the frame and to hold it level. These springs in practice drag upon the ground and are found very efficient in guiding and steadying the machine.

From the foregoing description, taken in connection with the drawings hereto annexed, the operation and advantages of my improved combined cotton chopper and cultivator will be readily understood. As the machine progresses over the field a rotary motion is imparted from the axle to the longitudinal counter-shaft carrying the chopping-hoes, which will thus be caused to chop or thin out the row of growing plants. The plows at the front end of the machine work on either side of the row to bar off the row, and the cultivators which follow in rear of the chopping-hoes serve to dirt up the row. When it is desired to turn at the end of the row, the front plows are raised out of the ground by means of the operating-lever, and the frame of the machine may then be tilted upon the supporting-wheels, so that it may be easily turned.

The general construction of the machine is simple and inexpensive, and it may be very easily and conveniently manipulated with excellent results.

Having thus described my invention, I claim and desire to secure by Letters Patent of the United States—

1. In a cotton-chopper, the combination of the frame, the axle journaled in the side pieces of the same and having the supporting-wheels mounted securely thereon, a counter-shaft having a pinion meshing with a bevel-gear upon the axle, a rectangular block mounted upon said counter-shaft and having transverse perforations on opposite sides of the said shaft, and the hoe-shanks extending from opposite sides through said perforations and having their opposite ends connected by plates, substantially as and for the purpose set forth.

2. In a cotton-chopper, the combination, with the longitudinal revolving shaft, of a block mounted securely on said shaft and having transverse perforations on opposite sides thereof, the hoe-shanks having blades at their outer ends and extending from opposite sides through the perforations in the said block, the plates connecting the opposite ends of the said hoe-shanks, and the keys to secure the latter in the said block, substantially as and for the purpose set forth.

3. The combination of the longitudinal revolving shaft, the block mounted securely on the said shaft and having transverse perforations on opposite sides of the latter, the hoe-shanks carrying the blades and having screw-threaded outer ends, and the connecting-plates having openings to admit of the passage of the hoe-shanks and provided at their opposite ends with screw-threaded perforations to receive the ends of said shanks, substantially as and for the purpose set forth.

4. The combination of the longitudinal revolving shaft, the block mounted securely on the said shaft and having transverse perforations on opposite sides of the latter, the hoe-shanks carrying the blades and having screw-threaded outer ends, the connecting-plates having openings to admit of the passage of the hoe-shanks and provided at their opposite ends with screw-threaded perforations to receive the ends of the said shanks, and the keys to secure the hoe-shanks in the block upon the revolving shaft, substantially as and for the purpose set forth.

5. In a cotton chopper and cultivator, the combination of the frame having cross-bars at its front and near its rear end, the transverse bolts or rods in rear of the said cross-bars, the feet or standards mounted pivotally on said rods and having longitudinal slots, the spacing-sleeves, the curved bolts extending through the slots in the standards and through the cross-bars of the frame and having heads at their lower ends and adjusting-nuts at their upper ends, the plows and shovels upon the said standards, and means for raising the front standards out of the ground, substantially as and for the purpose set forth.

In testimony that I claim the foregoing as my own I have hereto affixed my signature in presence of two witnesses.

WILLIAM DANIEL PORTER.

Witnesses:
J. G. W. WOOD,
GEO. F. CONLY.